3,640,969
PROCESS FOR PREPARING SOLUBLE POLYIMIDE BY THE POLYCONDENSATION OF MELLOPHANIC DIANHYDRIDE, PYROMELLITIC DIANHYDRIDE, AND AN AROMATIC DIAMINE, FOLLOWED BY IMIDATION OF THE POLYCONDENSATION PRODUCT

Shigeyuki Suzuki, Kanagawa, and Isamu Kaneda, Masaaki Takahashi, and Hiroshi Nagai, Tokyo, Japan, assignors to Kureha Kagaku Kogyo Kabushiki Kaisha, Tokyo, Japan
No Drawing. Filed Feb. 3, 1969, Ser. No. 796,174
Claims priority, application Japan, Feb. 1, 1968, 43/6,141
Int. Cl. C08g 20/32
U.S. Cl. 260—78 TF                                   17 Claims

ABSTRACT OF THE DISCLOSURE

A process for producing a soluble polyimide by the polycondensation of mellophanic and pyromellitic dianhydride and an aromatic diamine, followed by the imidation of the polycondensation product. A polyimide solution thus prepared is also claimed.

BACKGROUND OF THE INVENTION

Field of the invention

The present invention relates to a process for the preparation of soluble polyimides.

Description of the prior art

Hitherto, aromatic polyimides having excellent heat resistance have been prepared from aromatic tetracarboxylic dianhydrides and aromatic diamines. However, although heat resistance is excellent, polyimides thus prepared have processability or moldability which is poor, and it is very difficult to mold the polyimides as prepared. Therefore, in order to process the polyimides into films or fibers, a polyamide acid (which is a precursor of the polyimide) is formed and thereafter this material is converted into the insoluble aromatic polyimide by means of a heat treatment or a chemical treatment. In other words, since it is impossible to fabricate polyimide directly which is easily processable, the polyamide acid is first fabricated and thereafter the polyamide acid is converted into the polyimide. Such conventional processes suffer the following faults: the process is complicated, fabrication is restricted, and the polyamide acid itself is thermally and chemically unstable and thus the polyamide acid must be stored with utmost care.

As mentioned above, aromatic polyamide acids are generally unstable and upon storage for long periods of time at normal temperatures, decompose slowly to reduce the polymerization degree thereof or cause gelation. Thus, the properties of a film or coating obtained therefrom are severely degraded. In addition, when the polyamide acid is converted into the polyimide by a heat treatment or other physical or chemical treatment, the aromatic polyamide acid yields water by imidation, particularly in the case of film or coating production. This heat causes bubbles on the film or the coating of polyimide in the case of production of a thick film.

As mentioned above, when an aromatic polyimide product is prepared, an aromatic polyamide acid solution is usually employed at present, and therefore, the imidation of the polyimide acid encounters the aforesaid processing problems, in addition to the fact that the solution itself is very unstable, thermally, and is gradually denatured to severely reduce the value of the final product prepared. Therefore, the solution of aromatic polyamide acid must generally be stored at low temperatures, since temperature increase extremely shortens the so-called "pot life." These troubles are due to the fact that polyimides cannot satisfactorily be fabricated as is, although conventional aromatic polyimides have excellent heat resistance.

The process of the present invention provides a solution to the above problems which have heretofore troubled the prior art.

SUMMARY OF THE INVENTION

The present invention provides a novel process for producing a soluble polyimide resin which is capable of being directly fabricated as a polyimide without loss of heat resistance or other desirable chemical properties.

The process basically comprises polycondensing a mixture comprising mellophanic dianhydride, pyromellitic dianhydride and an aromatic diamine, followed by imidation of the polycondensation product. Based on the total amount of dianhydride present, the mellophanic dianhydride comprises at least 50% of the mixture, and the pyromellitic dianhydride comprises no more than 50% of the mixture. The aromatic diamine is present in an almost equivalent amount, based on the amount of dianhydrides present, most preferably from about 95 to about 105 mole percent.

Polycondensation is most preferably performed in a polar solvent, but may be performed in a polar-non-polar solvent mixture, as long as the polar solvent comprises at least 50% of the mixture.

Preferred process conditions are indicated in the specification.

An object of the present invention is to provide a process for preparing an aromatic polyimide having excellent heat resistance and good solubility, as well as good fabricability.

DESCRIPTION OF THE PREFERRED EMBODIMENTS

As the result of various investigations, the inventors have succeeded in the preparation of a soluble polyimide resin capable of being directly fabricated in the state of the polyimide, without losing the excellent heat resistance of the polyimide. Thus, the present invention discloses a polyimide capable of being fabricated, desirably a chemically and thermally stable polyimide, can be prepared without the necessity of the step of fabrication as a polyamide acid and hence without the storage problem due to the instability of the polyamide acid, as well as without the various problems in fabrication due to the loss of water in the imidation of the polyamide acid. In fact, the heat resisting aromatic polyimide thus prepared can be fabricated directly without the necessity of using the polyamide precursor.

According to the present invention, a polyimide having excellent heat resistance and good solubility can be prepared by reacting a mixture of a large proportion of mellophanic dianhydride (1,2,4,5-benzenetetracarboxylic dianhydride) and a small proportion of pyromellitic dianhydride (1,2,3,4-benzenetetracarboxylic dianhydride) as aromatic acid dianhydrides and an aromatic diamine, e.g. an almost equimolar amount of 3,3′-diaminodiphenyl ether.

The mixing ratio of mellophanic dianhydride to pyromellitic dianhydride in the above-mentioned reaction can be controlled upon considering the solubility of polyimide obtained therefrom. It is desirable that the proportion of the mellophanic dianhydride in the mixture of the mellophanic dianhydride and the pyromellitic dianhydride be in a range of from 50% to 85% by weight. If the proportion of the mellophanic dianhydride is higher than 85% by weight or less than 50% by weight, the solubility of the product in organic solvents is insufficient.

However, the solubility of the product is largely influenced by the type of the aromatic diamine reacted (shown below) and it will be understood that the aforesaid range of the mixing ratio for solubility is only for the case of employing 3,3'-diaminodiphenyl ether as the aromatic diamine and the invention is not to be limited to this exact mixing ratio.

As the aromatic diamines used with the mixture of the aforesaid aromatic acid anhydrides, there can be employed 3,3'-diaminobenzophenone, 3,3'-diaminodiphenyl methane, 3,3'-diaminodiphenyl ether, 3,3'-diaminodiphenyl sulfide and the like and, among these aromatic diamines, 3,3'-diaminodiphenyl ether provides a product having excellent solubility when used together with the mixture of the aforesaid aromatic acid anhydrides.

Furthermore, the aromatic diamines used for preparing the polyamide acid may be employed alone as well as mixtures thereof, to thereby provide a product having excellent solubility in solvents.

To further describe the above reaction, generally the polycondensation may be performed at pressures ranging from sub-atmospheric to super-atmospheric, but it is preferred to conduct the polycondensation at a pressure below 20 kilograms per square centimeter. Further, the reaction generally requires a period of time within the range of from about 10 minutes to about 100 hours, though the time may be varied depending upon the exact process conditions utilized.

In the polycondensation reaction, the following ratios can be utilized to describe the preferred material ranges:

|  | Mols |
|---|---|
| Mellophanic dianhydride | 50–95 |
| Most preferred | 50–85 |
| Pyromellitic dianhydride | 5–50 |
| Most preferred | 15–50 |
| Amine | 95–105 |

Solvent (within the range 1.5 to 2.0 times the total amount of monomer).

The percentages corresponding to the above ranges can be easily determined.

The aforesaid reaction can generally be conducted in a polar organic solvent or a solvent mixture and it is unnecessary to consider the solubility of the polyamide acid formed by the reaction of the aromatic acid anhydrides and the aromatic diamine in the solvent used to conduct the reaction.

It should be noted that mixtures of polar and non-polar solvents may be utilized, as long as the amount of non-polar solvent is less than 50% of the total amount of solvent. Examples of acceptable non-polar solvents are toluene, xylene, tetrachlorethylene, carbon disulfide, cyclohexane and the like.

In contrast, polyimides prepared in a conventional manner are generally infusible and insoluble and they cannot be directly fabricated as a polyamide. Hence, the prior art fabrication must be conducted with a polyimide acid, and the system must be in a state of solution, at least in the polyamide acid state, and accordingly, a solvent capable of dissolving the aromatic polyamide acid must be used for the reaction. Therefore the prior art reactions extremely restrict the kind of solvents useable. In other words, the prior art reaction can be conducted only in limited kinds of solvents, such as N-methyl pyrrolidone or dimethyl acetamide.

On the other hand, since the polyimide prepared by the process of the present invention is soluble in organic solvents, the polyamide acid need not necessarily be soluble in the solvent. That is, any solvent which enables the reaction of this invention to proceed smoothly can be employed, regardless of the solubility of polyamide acid therein. In addition, the reaction may be conducted in a homogeneous system as well as in a heterogeneous system. This point is one of the most important merits of the present invention.

In other words, the polycondensation reaction of this invention can be carried out in various solvents and the polyamide acid prepared can be converted into the polyimide by various methods. However, the particularly important feature of the present invention is that when a solvent capable of dissolving the polyamide acid prepared as well as the polyimide prepared from the polyamide acid (as the polymerization solvent) is employed, the aforesaid reaction can be conducted throughout in a homogeneous system to provide a homogeneous solution of the polyimide, which can be used as it is in subsequent fabrication steps. Moreover, in the above case, after adding an insoluble imidation agent to the homogeneous solution of the aromatic polyamide acid, the imidation can be conducted in a heterogeneous system, and after imidation, the imidation agent used may be separated to prevent the solution of the imidized product from being contaminated by the imidizing agent. For example, when particles of inorganic molecular sieve as the imidation agent are dispersed, with stirring, in a solution of the aromatic polyamide acid, the dehydration is conducted very smoothly, whereby the aromatic polyamide acid in the solution is converted into the aromatic polyimide. Thereafter, by separating the molecular sieve used as the imidizing agent from the aforesaid solution, a homogeneous solution containing polyimide is obtained, while the molecular sieve separated can be used repeatedly after drying.

To further describe the imidation reaction of the present invention, this is generally conducted in a temperature within the range of from about 10–150° C. Pressure is non-critical to this reaction, and it may be performed at sub-atmospheric to super-atmospheric pressures, most preferably below 20 kilograms per square centimeter. The time of reaction is essentially non-critical, and the reaction may be performed within any desired time, most preferably from about 30 minutes to about 50 hours. The amount of solvent used in the imidation reaction is non-critical to the present invention, the only quantitative criteria which is necessary is that the solvent which is added, if any, insures that the mixture can be stirred to enable contact of the materials. To further define the imidation agent of the present invention, during imidation, it is preferred to use from about 0.5 to about 30 times the total amount of the polyamide acid of the molecular sieve. When acetic acid anhydride is used, most preferably from about 1–30 moles of the acetic acid anhydride are utilized per mole of amide groups included in the polyamide acid. When pyridine is utilized, most preferably from about 0.5 to about 15 moles of pyridine per mole of amide groups included in the polyamide acid is utilized. Similar ranges can be used for any imidation agent used, the "broad" encompassing range defined above thus including 0.5–30 moles of imidation agent per mole of the amide groups in the polyamide acid.

A further merit of the present invention is that even if the polyimide is contaiminated by an imidation agent when the imidizing agent is added to a solution of the polyamide acid to convert the polyamide acid into polyimide, the polyimide can be purified by a reprecipitation method, for example, by utilizing the fact that the polyimide thus prepared is soluble in solvents.

Therefore, any inorganic or organic imidation agent which can be reacted immediately with water or which has a strong dehydration power and is capable of converting the polyamide acid into the polyimide without decomposing the polyamide acid may be employed, regardless of whether the imidizing system is a homogeneous system or a heterogeneous system.

The polycondensation reaction for preparing the polyamide acid by the reaction of the acid anhydride and the amine may be carried out at a temperature range of from —60° C. to 50° C., but is preferably conducted at a temperature range of from 0° C. to room temperature.

The polyimide obtained by the imidization of the aromatic polyamide acid prepared by the polycondensation reaction of this invention is thermally stable, and even when the polyimide is heated as a powder or film in air up to 470° C., no weight loss is observed. When the product is heated to a temperature higher than 470° C., the product begins to decompose. Also, as shown in the following table, the product can be dissolved in many polar solvents, even at room temperature.

Solubility of the aromatic polyimides [1] of this invention:

| Solvent: | Solubility at room temperature |
|---|---|
| N,N-dimethyl acetamide | Amount dissolved is more than 30% by weight. |
| N,N-dimethyl formamide | Do. |
| Dimethyl sulfoxide | Do. |
| N-methyl pyrrolidone | Do. |
| Pyridine | Do. |
| Concentrated sulfuric acid | Do. |

It is clear from the above table that the polyimide obtained by the process of this invention shows a very excellent solubility. Moreover, a polyimide solution obtained therefrom is thermally and chemically stable, and is not denatured when it is stored for a long period of time.

From the solution of the aromatic polyimide obtained by the process of this invention, a very strong film can be prepared by casting methods, and fibers thereof can be prepared by spinning the solution into an organic solvent. The solution of the polyimide may also be used as a coating agent, a paint or an adhesive to be applied to electrical wires and in other articles. In particular, since the concentration of the solution of the above aromatic polyimide is very high and the solution itself is also very stable, it can be profitably used for the aforesaid purposes in commercial techniques.

The invention will further be explained in greater detail by the following examples:

EXAMPLE 1

Into 36.18 mg. of N,N-dimethylacetamide, there was dissolved 3.6551 g. (0.01825 mole) of 3,3'-diaminodiphenyl ether and, while ice-cooling the solution, a mixture of 2.8235 g. (0.01295 mole) of mellophanic dianhydride and 1.1578 g. (0.005308 mole) of pyromellitic dianhydride was added slowly to the resultant solution with stirring at 0–3° C. Further, by adding 2 ml. of N,N'-dimethyl acetamide thereto, a polyamide acid solution containing 17.5% by weight polymer was prepared. The intrinsic viscosity measured as an 0.5% solution thereof in N,N-dimethylacetamide was 1.21. A mixture of 3.91 g. of the polymer solution, 2.75 g. of N,N-dimethyl acetamide, and 6.13 g. of a molecular sieve (molecular Sieve 3A, manufactured by the U.C.C. Co.) was heated to 95° C. for 47 hours with stirring, and then the molecular sieve was filtered off to provide a yellow-brown, transparent polyimide solution. By directly casting the polyimide solution onto a glass plate, a strong, transparent, yellow-brown soluble polyimide film was obtained.

On the other hand, a part of the solution was added to benzene to form precipitates, which were collected and subjected to vacuum drying at room temperature to provide faintly yellow-brown powders. These powders showed a solubility greater than 30% at room temperature in polar organic solvents such as N,N-dimethyl acetamide, N,N-dimethyl formamide, pyridine, dimethyl sulfoxide, N-methyl pyrrolidone, etc. By dissolving the powders in such a solvent, a stable polyamide solution was obtained.

---

[1] The NSP/C value of the polyimide in N,N-dimethyl acetamide (C=5 g./100 ml.) at 20° C. is 0.8.

EXAMPLE 2

From the following compositions, a polyamide acid solution was prepared by the procedure of Example 1;

3,3'-diaminodiphenyl ether—3.6469 g.
Pyromellitic dianhydride—1.1903 g.
Mellophanic dianhydride—2.7819 g.
N,N-dimethyl acetamide—38.10 ml.

The intrinsic viscosity of a 0.5% solution of the polyamide in N,N-dimethyl acetamide was 0.89. The polymer solution was added, with stirring, to a mixture of 540 ml. of benzene, 360 ml. of pyridine, and 150 ml. of acetic anhydride to precipitate a polymer. The system was then allowed to sit, as it was, for 15 hours at room temperature and then for 3 hours at 80° C. In the infrared absorption spectrum of the polymer obtained, no absorption based on the amide group was observed, which indicates that the polymer was completely converted to polyimide. The polyimide powders obtained were faint yellow-brown and could be dissolved in a polar solvent such as N,N-dimethyl acetamide, N,N-dimethyl formamide, dimethyl sulfoxide and N-methyl pyrrolidone in an amount of more than 30% by weight. Also, by casting a 10% solution of the polymer in each of the aforesaid solvents on a flat glass plate, a strong, flexible faint yellow-brown polyimide film having no bubbles on the surface was obtained. From a measurement of the film by means of a thermobalance (at an increasing temperature rate of 5° C./min. in air) no weight loss was observed in each film up to 470° C.

The intrinsic viscosity of the polymer, measured as a 0.5% solution thereof in dimethyl acetamide at 20° C., was 0.98.

EXAMPLE 3

To 11.95 g. of an N,N-dimethyl acetamide solution of the polyamide acid obtained by the procedure of Example 2 were added 2.04 g. of acetic anhydride (which contained 2 molar times the repeating unit of polyamide acid) and 4.74 g. of pyridine (which contained 6 molar times of the repeating unit of the polyamide acid), and the mixture was treated for 16 hours at room temperature and for 3 hours at 80° C. The reaction proceeded as a homogeneous system to provide a faint yellow-brown transparent polyimide solution having a concentration of about 20%.

The solution was cast in a film using a doctor knife having an interval of 0.25 mm., and the film was dried for one hour at 100° C. Thus, a faint yellow-brown, transparent, flexible film was obtained.

On the other hand, a portion of the aforesaid polyimide solution was added to water-free benzene to form precipitates, which were separated by filtration and dried. The infrared absorption spectrum of the polymer obtained showed that a polyimide was formed. The polymer obtained as powders was soluble in a solvent such as dimethyl acetamide or sulfuric acid in an amount of more than 30% by weight, even at room temperature, and by dissolving the polymer in the solvent, a stable solution was obtained.

The film of the polyimide prepared above and the powdered polyimide were not decomposed at temperatures up to 470° C., when measured by means of a thermobalance.

What is claimed is:

1. A process for the production of a soluble polyimide which comprises:
   polycondensing in the presence of a solvent which comprises a major proportion of a polar solvent, mellophanic dianhydride in an amount of from about 50 to about 95 mole percent, pyromellitic dianhydride in an amount of from about 5 to about 50 mole percent, the concentration of both ingredients being based upon the total amount of both dianhydrides present and an aromatic diamine in an amount of from about 95 to about 105 molar percent, based on the total amount of mellophanic and pyromellitic dianhydride present, and subjecting the polycondensation product to imidation.

2. The process of claim 1 wherein said solvent consists of a polar solvent.

3. The process of claim 1 wherein said polar solvent is selected from the group consisting of N,N-dimethyl formamide, dimethyl sulfoxide, N-methyl pyrrolidone and pyridine.

4. The process as claimed in claim 1 wherein said aromatic diamine is selected from the group consisting of 3,3'-diaminobenzophenone, 3,3'-diaminodiphenylmethane, 3,3' - diaminodiphenylsulfide, and 3,3'-diaminodiphenyl ether.

5. The process as claimed in claim 1 wherein said imidation is performed in the presence of an imidation agent.

6. The process of claim 1 wherein said imidation agent is selected from the group consisting of a molecular sieve, a mixture comprising benzene, pyridine and acetic anhydride, and a mixture comprising acetic anhydride and pyridine.

7. The process of claim 1 wherein said polymerization and said imidation are both conducted in a polar solvent.

8. A polyimide solution comprising a polyimide prepared by the process of claim 1.

9. The process of claim 1 wherein the polycondensation step is performed at a pressure below 20 kilograms per square centimeter.

10. The process of claim 1 wherein the amount of mellophanic dianhydride present ranges from about 50 to about 85 mole percent, based on the total amount of said dianhydrides.

11. The process of claim 1 wherein the amount of pyromellitic dianhydride present ranges from about 15 to about 50 mole percent, based on the total amount of said dianhydrides.

12. The process of claim 1 wherein the non-polar solvents employed are members selected from the group consisting of toluene, xylene, tetrachloroethylene, carbon disulfide, and cyclohexane.

13. The process of claim 1 wherein the imidation reaction is carried out at a temperature ranging from about 10 to about 150° C.

14. The process of claim 1 wherein the imidation reaction is carried out at a pressure of 20 kilograms per square centimeter and for a period of time ranging from about 30 minutes to about 50 hours.

15. The process of claim 1 wherein the amount of imidation agent present ranges from about 0.5 to 30 moles per mole of amide groups present in the polyamide acid.

16. The process of claim 1 wherein the temperature ranges from about $-60°$ C. to $50°$ C.

17. The process of claim 1 wherein the temperature is room temperature.

References Cited

UNITED STATES PATENTS

| 3,179,634 | 4/1965 | Edwards | 260—78 |
| 3,249,588 | 5/1966 | Gall | 260—78 X |
| 3,310,506 | 3/1967 | Amborski et al. | 260—78 X |
| 3,416,994 | 12/1968 | Chalmers et al. | 260—78 X |

HOWARD E. SCHAIN, Primary Examiner

U.S. Cl. X.R.

117—128.4, 161 P; 260—29.2 N, 30.2, 30.4 N, 30.8 R, 32.6 N, 47 CP, 65